United States Patent [19]

Dommer et al.

[11] Patent Number: 5,225,030
[45] Date of Patent: Jul. 6, 1993

[54] DEVICE FOR HEATED WEDGE PRESSURE DRAW WELDING OF SEPARATING SEAMS OF A COMPOSITE PLASTIC PROFILED HOLLOW SECTION

[76] Inventors: Armin Dommer, Eichweg 13; Dieter Dommer, Bahnhofstr. 5, both of D-7257 Ditzingen 1, Fed. Rep. of Germany

[21] Appl. No.: 791,584

[22] Filed: Nov. 12, 1991

[30] Foreign Application Priority Data

Nov. 14, 1990 [DE] Fed. Rep. of Germany ....... 4036245

[51] Int. Cl.$^5$ ............................................. B29C 65/18
[52] U.S. Cl. ................. 156/574; 156/272.2; 156/304.6; 156/583.1
[58] Field of Search .................. 156/583.1, 574, 304.6, 156/272.2

[56] References Cited

U.S. PATENT DOCUMENTS

| | | | |
|---|---|---|---|
| 4,069,087 | 1/1978 | Lüke et al. | 156/574 |
| 4,963,219 | 10/1990 | Nichols et al. | 156/304.6 |
| 5,006,198 | 4/1991 | Pasquini | 156/304.6 |

Primary Examiner—Jay H. Woo
Assistant Examiner—Khanh P. Nguyen
Attorney, Agent, or Firm—Speckman & Pauley

[57] ABSTRACT

A device for heated wedge pressure draw welding of separating seams of a composite plastic profiled hollow section. The device is drawn through the hollow chamber of a plastic profiled hollow section, in the course of which heating bars plasticize the seam walls of the separation seams and the plastic welding wires needed for welding. The plasticized plastic welding wires are pressed into the plasticized separation seams by press elements as the device is continuously drawn through the plastic profiled hollow section by a drawing device and a drive motor, the speed of which can be controlled.

26 Claims, 4 Drawing Sheets

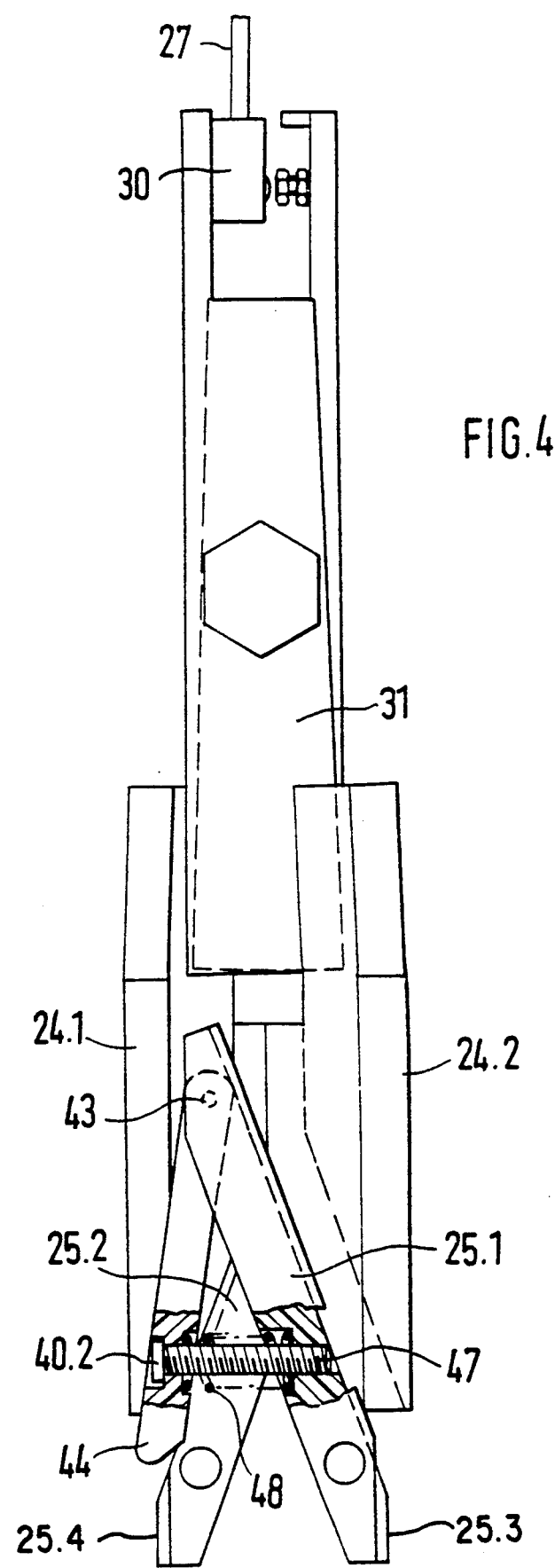

DEVICE FOR HEATED WEDGE PRESSURE DRAW WELDING OF SEPARATING SEAMS OF A COMPOSITE PLASTIC PROFILED HOLLOW SECTION

BACKGROUND OF THE INVENTION

1. Field of the Invention

This invention relates to a device for heated wedge pressure welding by drawing of separating seams of a composite plastic profiled hollow section.

2. Description of the Prior Art

When sealing off landfills, so-called drain walls made of foil sections are put together, which are closed off at their vertical ends with profiled sections. The profiled sections of adjacent foil sections can be pushed into each other in such a way that they form a plastic profiled hollow section. This plastic profiled hollow section is the weak point of the drain wall formed in this way because the separating seams between the profiled sections of the composite plastic profiled hollow section cause the drain wall to become permeable. Attempts have been made to seal this leaky place by filling the hollow chamber of the plastic profiled hollow section with epoxy resin. However, the epoxy resin does not combine with the plastic of the plastic profiled hollow section. As a result it is not possible to achieve an absolutely tight closure of the separating seams, particularly if the plastic profiled hollow section buried in the ground expands or contracts in the course of temperature changes.

SUMMARY OF THE INVENTION

It is an object of this invention to provide a device for welding the separation seams, even in composite plastic profiled hollow sections having a hollow chamber of small cross section.

In accordance with one embodiment of this invention, this object is attained where a support element is inserted into the hollow chamber of the plastic profiled hollow section on which drawing means have been attached. The support element has one heating bar with a cartridge-type heater and thermal sensor for each separation seam. The heating bars plasticize the seam walls of the respectively assigned separation seam and receive and plasticize a plastic welding wire with a tear-resistant inlay. The ends of the plastic welding wires extending from the heating bars can be fastened to one end of the hollow chamber after having been inserted into the plastic profiled hollow section. The plasticized plastic welding wires extending from the heating bars can each be pressed into the associated separation seam by means of a press element. Drawing means are connected outside of the plastic profiled hollow section to a drive motor, the speed of which can be controlled, which drive motor draws, in conjunction with the drawing means, the support element with the heating bars and the press elements, along the plastic welding wires through the plastic profiled hollow section.

The device can be inserted into the hollow chamber of the composite plastic profiled hollow section, even if the profiled hollow section is only accessible from a front side, which readily occurs when drain walls are laid in a narrow ditch. The support element has elements for plasticizing the seam walls of the separation seams and the plastic welding wires, as well as press elements which, when the device is pulled out, press the plasticized plastic welding wires into the separation seams which are also plasticized. It is important in this connection that the ends of the plastic welding wires can be fastened to one end of the plastic profiled hollow section and that the plastic welding wires do not tear. For this reason, they are provided with a tear-resistant inlay. The drawing means extend out of the plastic profiled hollow section, as do the plastic welding wires. The support element with the heating bars and the press elements is moved by the drawing means operated by means of a drive motor, the speed of which can be controlled, in such a way that the plasticizing operation and the pressing operation is performed over the length of the separation seams during the appropriate time. Temperature measurement in the area of the heating bars provides the starting command.

Insertion of the support element into the hollow chamber of the plastic profiled hollow section is facilitated by the support element having two levers, rotatably connected to each other, which can be pivoted by a pneumatically or hydraulically controllable cylinder with respect to each other and in the direction of the separation seams. The cylinder is charged with a control medium through a control line. During insertion, the levers are in a collapsed position which reduces the cross section of the device, and they are adjusted by the cylinder to an operating position. In a preferred embodiment of this invention, the levers are double-armed, where the lever arms oriented towards the drawing means can be pivoted by the cylinder, while the lever arms oriented away from the drawing means support the heating bars and press elements. The drawing means are fastened on the lever arm of the one lever while the cylinder is fixed on the lever arm of the other lever.

To ensure that the heating bars can perform their function in accordance with one embodiment of this invention, the heating bars have an external contour which is adapted to the shape of the separation seams, and the heating bars have a passage, the cross section of which is adapted to the cross section of the plastic welding wires.

As a result, the outer contour of the heating bar plasticizes the seam wall of the associated separation seam and the plastic wire is plasticized inside the connecting conduit when the support part is drawn through the plastic profiled hollow section at the correct speed.

The plasticized welding wire exits the passage of the heating bar and is pressed into the associated separation seam by the associated press element, where it combines with the plasticized seam walls. In accordance with a further embodiment of this invention, the press elements are made of Teflon ® and partially cover the passage of the heating bars on the side facing away from the separation seam.

In accordance with another embodiment of this invention, the cartridge-type heaters and thermal sensors of the heating bars are run out of the plastic profiled hollow section by connecting cables and the heating bars are connected to a power source outside of the plastic profiled hollow section. As a result, the temperature of the heating bars can be monitored, as well as the plasticizing process, from outside the plastic profiled hollow section.

So that the heating bars and press elements maintain their defined operating position while being drawn through the plastic profiled hollow section, in accordance with another embodiment of this invention, the operating position of the levers of the device is guided non-twistably through the hollow chamber of the plastic profiled hollow section by the heating bars and the press elements.

In accordance with yet another embodiment of this invention, the fastening of the ends of the plastic welding wires in the plastic profiled hollow section is accomplished where the ends of the plastic welding wires are connected to each other by a clamp that can be braced against the interior walls, particularly of the separation seams, by an adjustment device extending from the plastic profiled hollow section.

A steel wire or the like is used as the tear-resistant inlay of the plastic welding wires, which is preferably embedded. However, tear resistance can also be achieved by other means, which can also be connected in other ways to the plastic welding wire.

BRIEF DESCRIPTION OF THE DRAWINGS

This invention will be better understood in light of the drawings and following detailed description, wherein:

FIG. 4 is a lateral view of the device for draw welding of the separation seams in accordance with another embodiment of this invention.

DESCRIPTION OF PREFERRED EMBODIMENTS

Figure 1:
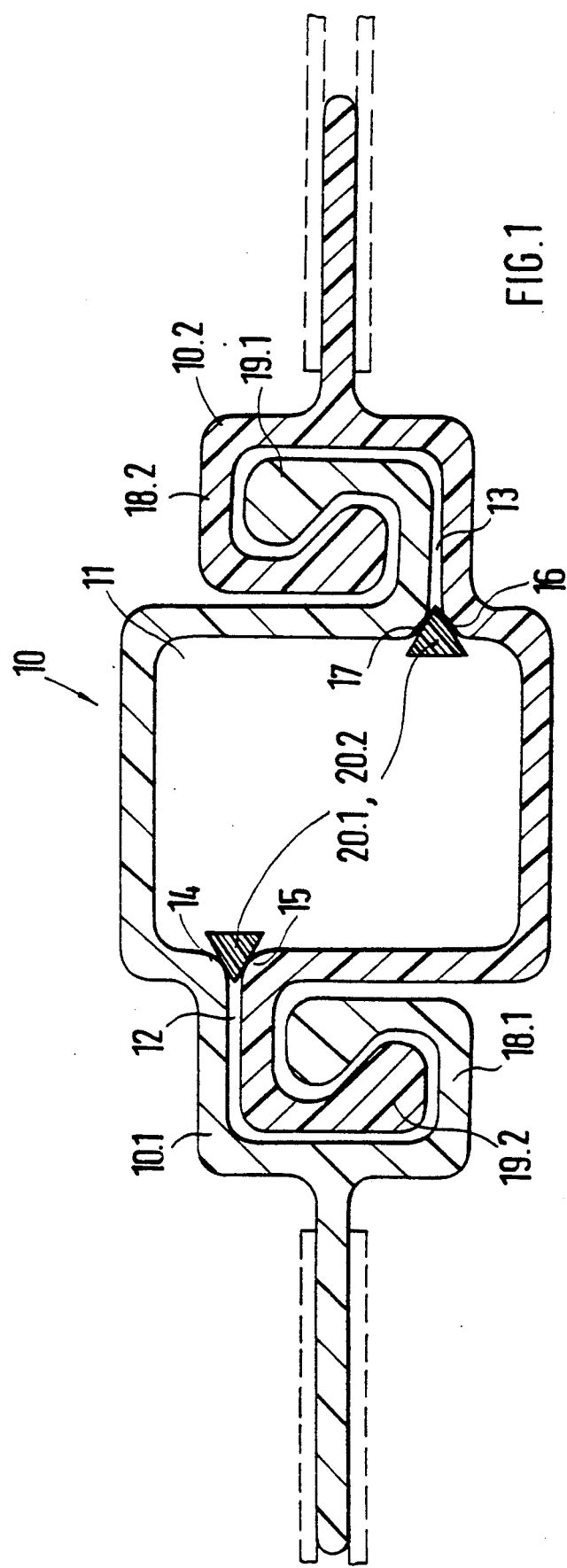
FIG. 1 is a cross-sectional view of a plastic profiled hollow section composed of two identical hollow sections.

The plastic profiled hollow section 10 in accordance with FIG. 1 comprises two identical hollow sections 10.1 and 10.2 which enclose a hollow chamber 11 approximately square or rectangular in cross section. The hollow sections 10.1 and 10.2 each form two sidewalls of the plastic profiled hollow section 10 which have on one lateral edge connecting grooves 18.1 or 18.2 and on the other lateral edge corresponding connecting bars 19.1 or 19.2 and which are pushed into each other, turned by 180°. Projecting fastening flanges are formed on the connecting grooves 18.1 or 18.2 to which the foils of the drain wall section are welded. The wall may easily be of two layers. The two hollow sections 10.1 and 10.2 form a gap where they abut, which extends from the top of the drain wall to the bottom of the drain wall. To close this gap, the separation seams 12 and 13, formed in the direction of the hollow chamber 11 between the walls of the hollow sections 10.1 and 10.2, are welded as shown by the welding wires 20.1 and 20.2 which are welded from within the hollow chamber 11 to the gap walls 14 and 15 or 16 and 17 by a device in accordance with one embodiment of this invention as sown in FIGS. 2 and 3.

During heated wedge pressure draw welding, the composite plastic profiled hollow section 10 with the foils welded to the hollow sections 10.1 and 10.2 is typically located in a ditch, as a result of which the hollow chamber 11 with the separation seams 12 and 13 is only accessible from the upper front face. The device, in accordance with one embodiment of this invention, has a cross section such that it can be easily inserted into the hollow chamber 11 and displaced therein as far as the lower, inaccessible end of the hollow chamber 11.

The device, in accordance with one embodiment of this invention, comprises support element 31, on which the two levers 32 and 33 are pivotably seated in the pivot bearing 26. In the direction towards the lower end of the hollow chamber 11, the levers 32 and 33 have the heating bars 24.1 and 24.2. The heating bars 24.1 and 24.2 have an outer contour which is adapted to the separation seams 12 and 13. In the direction towards the upper end of hollow chamber 11, the levers 32 and 33 are deflectable in the direction towards the upper end by a pneumatically or hydraulically controllable cylinder 30. The lever ends oriented towards the lower end of the hollow chamber 11 are crossed, so that they are also deflected and are pressed against the separation seams 12 and 13. Positioning of the heating bars 24.1 and 24.2 into the operating position occurs only after the device has been inserted as far as the lower end of the hollow chamber 11. The heating bars 24.1 and 24.2 have a passage with a cross section adapted to the cross section of the welding wires 20.1 and 20.2. The welding wires 20.1 and 20.2 are provided with a tear-resistant inlay, for example an embedded steel wire, so that they do not tear even in the plasticized state when the device is run up on them. The heating bars 24.1 and 24.2 are heated by cartridge-type heaters and their temperature is monitored by thermal sensors. The connecting cables 28.1 and 28.2 lead the cartridge-type heaters and the thermal sensors out of the plastic profiled hollow section 10 and can be connected to a power source or a control device. When the device is inserted, the plastic welding wires 20.1 and 20.2 extend out of the heating bars 24.1 and 24.2 at the lower ends of the passages and are connected to each other by the clamp 22. The clamp 22 is operated by an adjustment device, for example, adjusting rod 23, so that at the start of the welding operation, the lower ends of the plastic welding wires 20.1 and 20.2 are clamped in the separation seams 12 and 13 and thus are immovably fixed. The press elements 25.1 and 25.2 extend out of the lower ends of the heating bars 24.1 and 24.2 and are also fastened on the levers 32 and 33. The press elements 25.1 and 25.2 partially cover the outlets of the passages of the heating bars 24.1 and 24.2 on the side facing away from the separation seams 12 and 13, so that the plasticized plastic welding wires 20.1 and 20.2 emerging from the heating bars 24.1 and 24.2 are pressed into the separation seams 12 and 13. Because the seam walls 14 and 15 or 16 and 17 of the separation seams 12 and 13 have also been plasticized by the outer contours of the heating bars 24.1 and 24.2 resting on them, good welded connections are obtained which firmly close the separation seams 12 and 13.

To perform welding over the entire length of the separation seams 12 and 13, the drawing means 29 are fastened on the lever 33, extended from the top of the plastic profiled hollow section 10 and connected to a drive motor, the speed of which can be controlled. Consequently, the device can be drawn through the entire plastic profiled hollow section 10 in the time set for the welding. The device is pulled upwards on the plastic welding wires 20.1 and 20.2 threaded into the heating bars 24.1 and 24.2, while the cylinder 30 remains in operation and keeps the heating bars 24.1 and 24.2, as well as the press elements 25.1 and 25.2, in the operational position. The heated heating bars 24.1 and 24.2 take over plasticizing of the plastic welding wires 20.1 and 20.2 as well as of the seam walls 14 and 15 or 16 and 17 of the separation seams 12 and 13.

The drawing means 29 in accordance with one embodiment of this invention comprises a draw chain. In accordance with another embodiment of this invention, a special energy conducting chain is utilized, the chain links of which enclose a hollow chamber through which the connecting cables 28.1 and 28.2, the adjusting rod 23 and the plastic welding wires 20.1 and 20.2 can be directed. Such an energy conducting chain provides the advantage that these elements are protectively housed and that in the stretched position it can transfer a sufficiently high thrust force on the device with the support element 31.

Figure 3:
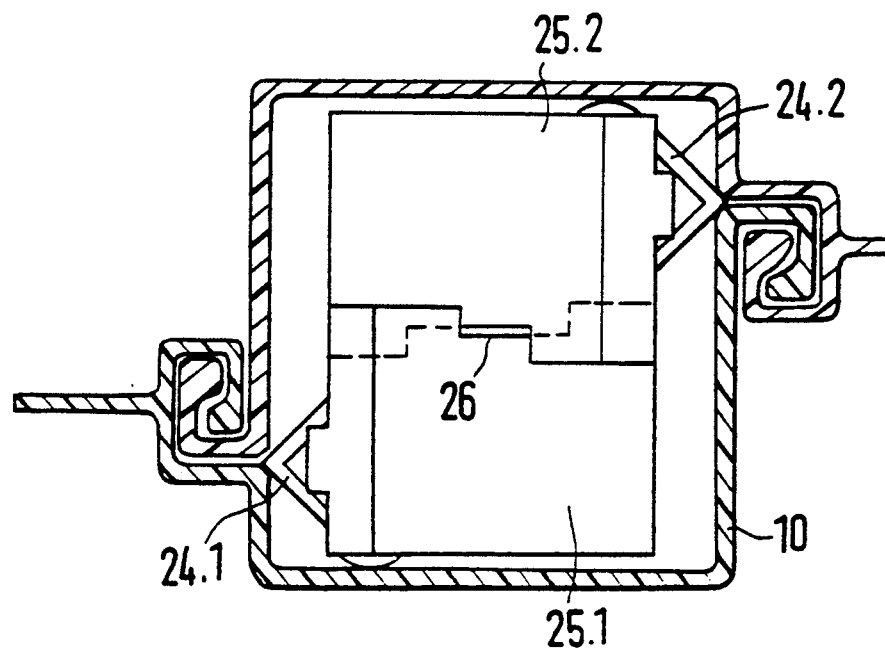
FIG. 3 is a cross-sectional view showing the device in accordance with FIG. 2 in the operating position inside a plastic profiled hollow section.

As shown in FIG. 3, in the operating position, the device is guided non-twistably in the hollow chamber 11 of the composite plastic profiled hollow section 10 by the levers 32 and 33 with the press elements 25.1 and 25.2 as well as the heating bars 24.1 and 24.2.

Figure 2:
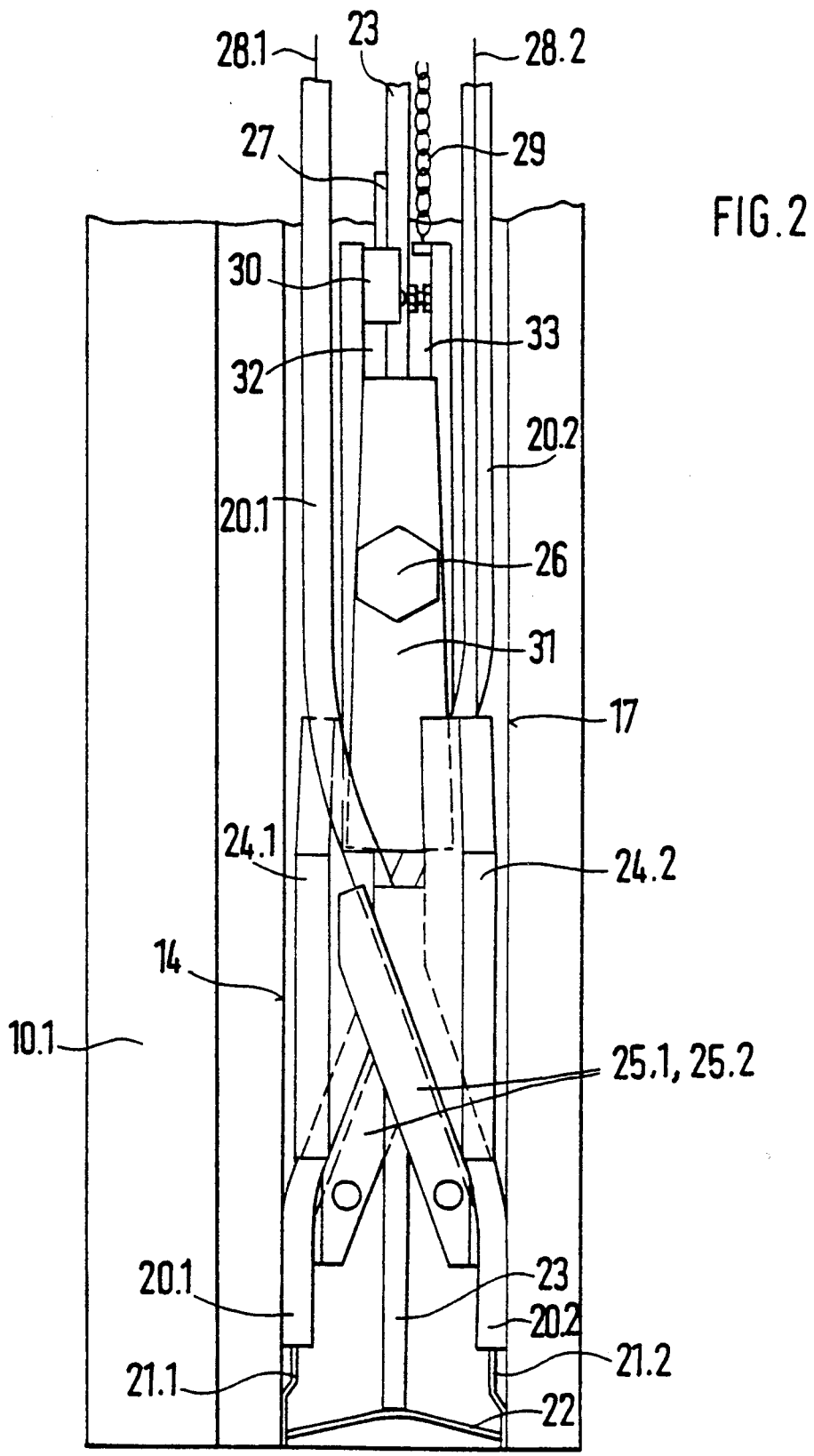
FIG. 2 is a lateral view of the device for heated wedge pressure welding by drawing of the separation seams in a plastic profiled hollow section, in accordance with one embodiment of this invention.
Figure 5:
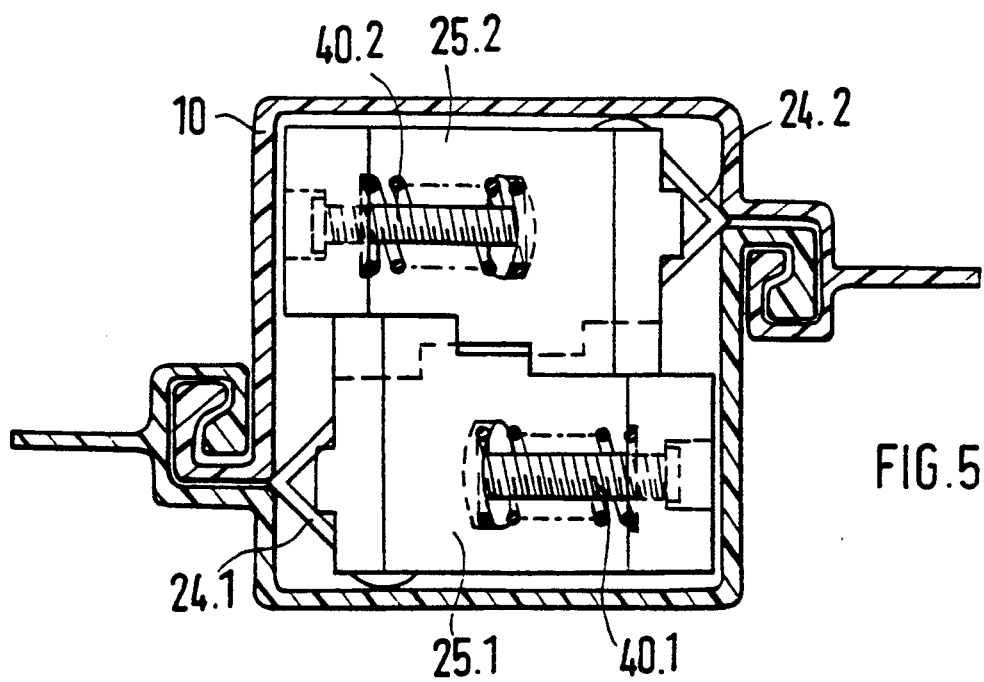
FIG. 5 is a cross-sectional view showing the device in accordance with FIG. 4 in the operational position inside a plastic profiled hollow section.

The device in accordance with an embodiment of this invention illustrated in FIGS. 4 and 5 essentially differs from the device in accordance with the embodiment shown in FIG. 2 in that the rotating and pivoting point 43 of the press elements 25.1 and 25.2 is disposed closer to the free ends of the press elements 25.1 and 25.2 which each cooperate with a pressure device 40.1 and 40.2. The pressure devices 40.1 and 40.2 each are a leg 44, hinged at the pivot point 43 and connected with the associated press element 25.1, 25.2 having guide section 25.3, 25.4, by a bolt 47 and a pressure spring 48. In this way the leg 44 and the associated press element are pressed against and guided along the interior wall of the profile section. Because the two press elements 25.1 and 25.2 are offset with respect to each other, the legs are also offset with respect to each other, resulting in the transfer of force from the device to the section in an improved manner. In particular, there is no unintentional flipping of the device inside the section.

There are many other embodiments of this invention which are within the scope of this basic idea. It might be possible, for example, to replace the spring by a pneumatic cylinder. In general, this is a device which presses the press elements against the interior wall of the section, where there is an even distribution of force, so that there can be no rotational movement of the device.

We claim:

1. A device for heated wedge pressure draw welding of separating seams of a composite plastic profiled hollow section, comprising,
    a support element (31) connected to drawing means (29) for drawing said support element (31) through said plastic profiled hollow section (10), said support element (31) insertable into a hollow chamber (11) of said plastic profiled hollow section (10),
    the support element (31) comprising one heating bar (24.1, 24.2) for each said separation seam (12, 13),
    an end of a plastic welding wire (20.1, 20.2) having a tear-resistant inlay (21.1, 21.2) extending from the heating bar (24.1, 24.2) fastenable to one chamber end of the hollow chamber (11) after insertion into the plastic profiled hollow section (10),
    said support element further comprising a press element (25.1, 25.2) whereby said plastic welding wire (20.1, 20.2) extending from said heating bar (24.1, 24.2) after being plasticized is pressable into said separation seam (12, 13) and combinable with said separation seam, and
    the drawing means (29) connected outside of the plastic profiled hollow section (10) to a drive motor, a speed of which can be controlled, whereby the support element (31) with the heating bar (24.1, 24.2) and the press element (25.1, 25.2) is drawn along the plastic welding wires (20.1, 20.2) through the plastic profiled hollow section (10).

2. A device in accordance with claim 1, wherein the support element (31) has a plurality of levers (32, 33), rotatably connected to each other, which are pivoted by one of a pneumatically and hydraulically controllable cylinder (30) with respect to each other and in a direction of the separation seams (12, 13), and
    the cylinder (30) is charged with a control medium through a control line (27).

3. A device in accordance with claim 1, wherein a plurality of levers (32, 33) have a first plurality of lever arms oriented towards the drawing means (29) which are pivotable by a cylinder (30) and a second plurality of lever arms oriented away from the drawing means (29) which support the heating bars (24.1, 24.2) and the press elements (25.1, 25.2).

4. A device in accordance with claim 3, wherein the drawing means (29) are fastened on one of said lever arms of one of the levers (33), and the cylinder (30) is fixed on another of said lever arms of another of said levers (32).

5. A device in accordance with claim 1, wherein the heating bar (24.1, 24.2) has an external contour which is adapted to a shape of the separation seams (12, 13), and
    the heating bar (24.1, 24.2) forms a passage, a cross section of which is adapted to a wire cross section of the plastic welding wires (20.1, 20.2).

6. A device in accordance with claim 1, wherein the press element (25.1, 25.2) is made of Teflon ® and partially covers a passage of the heating bar (24.1, 24.2) on a side facing away from the separation seam (12, 13).

7. A device in accordance with claim 1, wherein the cartridge-type heater and said thermal sensor of the heating bar (24.1, 24.2) is run out of the plastic profiled hollow section (10) by a connecting cable (28.1, 28.2).

8. A device in accordance with claim 1, wherein said device is guided non-twistably through the hollow chamber (11) of the plastic profiled hollow section (10) by the heating bar (24.1, 24.2) and the press element (25.1, 25.2) in an operating position of the levers (32, 33).

9. A device in accordance with claim 1, wherein the ends of the plastic welding wires (20.1, 20.2) from the heating bar (24.1, 24.2) are connected to each other by a clamp (22), and
    the clamp (22) is braceable against the seam walls of the separation seams (12, 13) by an adjustment means extending from the plastic profiled hollow section (10).

10. A device in accordance with claim 1, wherein a wire is embedded as the tear-resistant inlay (21.1, 21.2) of the plastic welding wires (20.1, 20.2).

11. A device in accordance with claim 1, wherein the press element (25.1, 25.2) is operably linked to at least one of a pressure device and a pressure body whereby said press element (25.1, 25.2) is pressed against an interior wall of the plastic profiled hollow section (10.1, 10.2).

12. A device in accordance with claim 1, wherein said press element (25.1, 25.2) is operably linked to a pressure device which is supported on one side on the press element (25.1, 25.2) and on the other side by an interior wall of the plastic profiled hollow section (10.1, 10.2).

13. A device in accordance with claim 1, wherein said press element (25.1, 25.2) comprises a pressure device (40.1, 40.2) in the form of one of a pressure spring and a pneumatic cylinder and a guide section (25.3, 25.4) whereby said press element (25.1, 25.2) is guided along an interior wall of the plastic profiled hollow section (10.1, 10.2).

14. A device in accordance with claim 1, wherein a guide section is provided with one of a roller and a low-friction material.

15. A device in accordance with claim 2, wherein a plurality of levers (32, 33) have a first plurality of lever arms oriented towards the drawing means (29) which are pivotable by a cylinder (30) and a second plurality of lever arms oriented away from the drawing means (29) which support the heating bars (24.1, 24.2) and the press elements (25.1, 25.2).

16. A device in accordance with claim 15, wherein the drawing means (29) are fastened on one of said lever arms of one of the levers (33), and the cylinder (30) is fixed on another of said lever arms of another of said levers (32).

17. A device in accordance with claim 16, wherein the heating bar (24.1, 24.2) has an external contour which is adapted to a shape of the separation seams (12, 13), and the heating bar (24.1, 24.2) forms a passage, a cross section of which is adapted to a wire cross section of the plastic welding wires (20.1, 20.2).

18. A device in accordance with claim 17, wherein the press element (25.1, 25.2) is made of Teflon ® and partially covers a passage of the heating bar (24.1, 24.2) on a side facing away from the separation seam (12, 13).

19. A device in accordance with claim 18, wherein the cartridge-type heater and said thermal sensor of the heating bar (24.1, 24.2) is run out of the plastic profiled hollow section (10) by a connecting cable (28.1, 28.2).

20. A device in accordance with claim 19, wherein said device is guided non-twistably through the hollow chamber (11) of the plastic profiled hollow section (10) by the heating bar (24.1, 24.2) and the press element (25.1, 25.2) in an operating position of the levers (32, 33).

21. A device in accordance with claim 20, wherein the ends of the plastic welding wires (20.1, 20.2) extending from the heating bar (24.1, 24.2) are connected to each other by a clamp (22), and the clamp (22) is braceable against the seam walls of the separation seams (12, 13) by an adjustment means extending from the plastic profiled hollow section (10).

22. A device in accordance with claim 21 wherein a wire is embedded as the tear-resistant inlay 21.2) of the plastic welding wires (20.1, 20.2).

23. A device in accordance with claim 22, wherein the press element (25.1, 25.2) is operably linked to at least one of a pressure device and a pressure body whereby said press element (25.1, 25.2) is pressed against an interior wall of the plastic profiled hollow section (10.1, 10.2).

24. A device in accordance with claim 23, wherein said press element (25.1, 25.2) is operably linked to a pressure device which is supported on one side on the press element (25.1, 25.2) and on the other side by an interior wall of the plastic profiled hollow section (10.1, 10.2).

25. A device in accordance with claim 24, wherein said press element (25.1, 25.2) comprises a pressure device (40.1, 40.2) in the form of one of a pressure spring and a pneumatic cylinder and a guide section (25.3, 25.4) whereby said press element (25.1, 25.2) is guided along an interior wall of the plastic profiled hollow section (10.1, 10.2).

26. A device in accordance with claim 25, wherein a guide section is provided with one of a roller and a low- friction material.

* * * * *